(12) United States Patent
Ikai

(10) Patent No.: US 6,441,061 B1
(45) Date of Patent: Aug. 27, 2002

(54) ADDITIVE FOR OIL-BASED INK FOR A BALL POINT PEN AND OIL BASED INK FOR A BALL POINT PEN CONTAINING THE SAME

(75) Inventor: Takayuki Ikai, Yokohama (JP)

(73) Assignee: Mitsubishi Pencil Kabushiki Kaisha, Tokyo (JP)

(*) Notice: Subject to any disclaimer, the term of this patent is extended or adjusted under 35 U.S.C. 154(b) by 0 days.

(21) Appl. No.: 09/701,167

(22) PCT Filed: May 26, 1999

(86) PCT No.: PCT/JP99/02776

§ 371 (c)(1),
(2), (4) Date: Feb. 16, 2001

(87) PCT Pub. No.: WO99/61536

PCT Pub. Date: Dec. 2, 1999

(30) Foreign Application Priority Data

May 26, 1998 (JP) ............................................. 10-144756

(51) Int. Cl.[7] ................................................. C08K 3/34
(52) U.S. Cl. ........................ 523/160; 523/161; 524/492; 524/493
(58) Field of Search ................................. 523/160, 161; 524/492, 493

(56) References Cited

FOREIGN PATENT DOCUMENTS

| JP | 6-313144 | 11/1994 | ........... C09D/11/18 |
|----|----------|---------|-----------------------|
| JP | 7-196972 | 8/1995 | ........... C09D/11/18 |
| JP | 08-311388 | 11/1996 | ........... C09D/11/18 |
| JP | 10-204368 | 8/1998 | ........... C09D/11/18 |
| JP | 10-219173 | 8/1998 | ........... C09D/11/18 |
| JP | 10-219174 | 9/1998 | ........... C09D/11/18 |
| JP | 10-297158 | 11/1998 | ........... C09D/11/18 |

*Primary Examiner*—Edward J. Cain
(74) *Attorney, Agent, or Firm*—Darby & Darby

(57) ABSTRACT

A additive for an oil based ink for a ball point pen containing at least one or plural kinds of organic solvents, a resin and an inorganic fine particle thickener, wherein the additive has a viscosity of 1000 mPa·s or more at a shear rate of 5/s and at 0° C. and a viscosity of 50000 mPa·s or less at a shear rate of 5/s and at 50° C., and has an absorbance of from 0.01 to 5 at a wavelength of 900 nm when a cell is 1 cm long. This additive is added to an oil based ink for a ball point pen such that an amount of the additive becomes 0.1 to 30% by weight based on the total ink.

9 Claims, No Drawings

ADDITIVE FOR OIL-BASED INK FOR A BALL POINT PEN AND OIL BASED INK FOR A BALL POINT PEN CONTAINING THE SAME

TECHNICAL FIELD

The present invention relates to an additive for an oil based ink for a ball point pen and an oil based ink for a ball point pen containing the additive.

BACKGROUND ART

Conventionally, a ball point pen with a ball having a diameter of 0.7 mm that is charged with an oil based ink has been mainly used. However, due to diversification of use thereof and advancement of technology, a ball point pen with a ball having a diameter of 1.0 mm or more that is charged with an oil based ink has come to be sold extensively.

However, in the case that a tip with a ball having a large diameter is used, there is a problem in that the tip has large clearance to obtain an appropriate amount of ink discharge and hence ink leakage occurs readily when the ball point pen is left to stand with its tip downward.

To improve prevention of the ink leakage, an inorganic fine particle thickener has been added to an ink heretofore as disclosed in Japanese Patent Application Laid-Open No. Hei 10-204368 and Japanese Patent Application Laid-Open No. Hei 8-311388.

However, only adding an inorganic fine particle thickener to an ink gives rise to a tendency such that the inorganic fine particle thickener grows thicker and precipitates with the passage of time, which causes starving in the drawn line and impossibility of writing, while it is certain that the ink leakage occurs less frequently. Further, in the case that a whole ink is mixed by means of a three roll mill, there is a problem in that production efficiency is deteriorated and moreover that there is a tendency such that many blobbings occur due to strong shear onto a resin.

The present invention aims to solve the aforementioned problems and an object of the present invention is to provide an additive for an oil based ink for a ball point pen wherein the oil based ink for a ball point pen is prevented from thickening and precipitating with the passage of time when an inorganic fine particle thickener is added and does not cause leaking, starving in the drawn line and impossibility of writing and wherein the ink is superior in production efficiency and causes few blobbings. An additional object of the present invention is to provide an oil based ink for a ball point pen containing the additive.

DISCLOSURE OF INVENTION

The present inventors have conducted intensive studies on the aforementioned conventional problems to find the fact that the above intended additive for an oil based ink for a ball point pen and an oil based ink for a ball point pen containing the additive can be obtained by preparing in advance the additive containing at least one or plural kinds of organic solvents, a resin and an inorganic fine particle thickener and adding the additive to an oil based ink for a ball point pen. Thus, the present invention has been completed.

That is, the present invention comprises the following items (1) through (5).

(1) An additive for an oil based ink for a ball point pen containing at least one or plural kinds of organic solvents, a resin and an inorganic fine particle thickener, wherein the additive has a viscosity of 1000 mPa·s or more at a shear rate of 5/s and at 0° C. and a viscosity of 50000 mPa·s or less at a shear rate of 5/s and has at 50° C. and a non-Newtonian index of from 0.30 to 0.95 at 25° C., and wherein the additive has an absorbance of from 0.01 to 5 at a wavelength of 900 nm when a cell is 1 cm long.

(2) The additive for an oil based ink for a ball point pen described in item (1), wherein a specific surface area (BET method) of said inorganic fine particle thickener ranges from 30 to 500 $m^2/g$ and an average diameter of the primary particles thereof ranges from 5 to 50 nm.

(3) The additive for an oil based ink for a ball point pen described in item (1), wherein said inorganic fine particle thickener comprises inorganic fine particles containing $SiO_2$ of 70% by weight or more.

(4) The additive for an oil based ink for a ball point pen described in item (1), wherein polyvinyl pyrrolidone is contained as a resin in an amount of 0.05 to 10% by weight.

(5) An oil based ink for a ball point pen which contains 0.1 to 30% by weight of the additive described in any one of the above items (1) to (4).

By containing the additive in accordance with the present invention in an oil based ink for a ball point pen, the oil based ink for a ball point pen which is prevented leakage from a pen tip and does not cause starving and impossibility of writing with the passage of time can be provided.

BEST MODE FOR CARRYING OUT THE INVENTION

The embodiments of the present invention shall be explained below in detail.

The additive for an oil based ink for a ball point pen of the present invention (hereinafter referred to as "the additive") is characterized by containing at least one or plural kinds of organic solvents, a resin and an inorganic fine particle thickener.

Any organic solvents can be used as the organic solvents for the additive of the present invention with no particular restrictions as long as they are used for regular oil based ink for a ball point pen. Those organic solvents include, for example, benzyl alcohol, phenoxyethanol, propylene glycol, dipropylene glycol, 1,3-butylene glycol, hexylene glycol, tetralin, propylene glycol monophenyl ether, dipropylene glycol monomethyl ether, dipropylene glycol monoethyl ether, dipropylene glycol monobutyl ether, dipropylene glycol monomethyl ether acetate, tripropylene glycol monomethyl ether and N-methyl-2-pyrrolidone. These can be suitably selected to use alone or in combination of two or more.

A using amount of the organic solvents ranges from 15 to 90% by weight, preferably from 25 to 80% by weight and more preferably from 35 to 70% by weight based on the total amount of the additive.

Resins in the additive of the present invention are used for the purpose of increasing the viscosity of the additive and dispersing suitably the inorganic fine particle thickener to be added. Any resins can be used with no particular restrictions as long as they are used for regular oil based ink for a ball point pen.

Those resins include, for example, ketone resin, phenol resin, maleic acid resin, xylene resin, polyethylene oxide, rosin resin, rosin derivative, terpene resin, chmaroneindene resin, polyvinyl butyral, polyvinyl pyrrolidone, vinyl pyrrolidone-vinyl acetate copolymer, polymethacrylate and acrylic acid-methacrylic acid copolymer. These resins can be used alone or in combination of two or more.

The total amount of the resins to be used alone or in combination of two or more ranges from 5 to 80% by weight, preferably from 25 to 70% by weight and more preferably from 35 to 60% by weight based on the total amount of the additive. If the amount of the resins is below 5% by weight, a viscosity necessary for mixing the inorganic fine particle thickener by means of a three roll mill can not be obtained and if the amount of the resin exceeds 80% by weight, difficulty in mixing is found.

It is desired that, as one kind of the above resins to be added, polyvinyl pyrrolidone is contained in the additive preferably by 0.05 to 10% by weight or less, more preferably by 0.1 to 7% by weight. Containing polyvinyl pyrrolidone in the additive makes it possible to disperse effectively the inorganic fine particle thickener added.

Specific polyvinyl pyrrolidone includes PVP (manufactured by ISP Co. Ltd.) or Luviscoll (manufactured by BASF Co. Ltd.).

As for inorganic fine particle thickeners to be used for the additive of the present invention, desired are those which have an average diameter of the primary particles falling in a range from 5 to 50 nm and a specific surface area (BET method) falling in a range from 30 to 500 $m^2/g$ and which preferably contain $SiO_2$ in an amount of 70% by weight or more as the fine particle component.

Using the inorganic fine particle thickener falling in these specific ranges makes it possible to obtain the intended additive and oil based ink for a ball point pen.

A using amount of the inorganic fine particle thickener ranges from 0.03 to 30% by weight, preferably from 0.1 to 20% by weight and more preferably from 1 to 10% by weight based on the total amount of the additive. If the amount of the inorganic fine particle thickener is below 0.03% by weight, the thickener produce no effects as a preventive agent against leaking and if the amount of the inorganic fine particle thickener exceeds 30% by weight, it is difficult to prepare the additive having the intended properties.

In order to provide the oil based ink for a ball point pen in accordance with the present invention that is prevented from leaking and causes no starving in the drawn line and no impossibility of writing, it is necessary to render the inorganic fine particle thickener in the additive of the present invention being in a properly mixed condition.

If the mixing is conducted insufficiently, precipitation of the particles occurs when the additive is added to an ink, so that the precipitation in turn causes starving in the drawn line and impossibility of writing. On the other hand, if the mixing is conducted excessively, no effects on preventing the ink from leaking can be obtained when the additive is added to an ink. In the present invention, it has been found that the properly mixed condition of the inorganic fine particle thickener can be grasped by determining an absorbance at 900 nm after the inorganic fine particle thickener has been mixed in the additive.

That is, an absorbance at 900 nm after the components of the additive of the present invention has been mixed ranges from 0.01 to 5, preferably from 0.05 to 3 and more preferably from 0.1 to 2 when a cell is 1 cm long. If the absorbance is below 0.01, no effects as a preventing agent against leakage can be obtained and if the absorbance exceeds 5, starving in the drawn line and impossibility of writing are caused.

For the purpose of mixing the inorganic fine particle thickener, such mixing means as a kneader, a planetary mixer and a three roll mill can be used without any particular restriction as long as they are used for mixing high-viscosity liquid whose viscosity is 1000 mPa·s or more. It is preferable to use a three roll mill that provides strong shearing force.

The additive has preferably a viscosity of 1000 mPa·s or more at a shear rate of 5/s and at 0° C., a viscosity of 50000 mPa·s or less at a shear rate of 5/s and at 50° C. and has the non-Newtonian index of from 0.30 to 0.95 at 25° C.

The intended additive and oil based ink for a ball point pen can be obtained by setting the viscosity in the aforementioned ranges.

The additive of the present invention realized by the above constitution can be added to any oil based ink for a ball point pen with no particular restrictions as long as they are regular oil based ink compositions for a ball point pen.

The solvents shown in the above can be used as a solvent for an oil based ink for a ball point pen (base ink). The resins shown in the above can be used as a resin for the ink. All the colorants comprising publicly known dyes and/or pigments which are used for conventional ink for a ball point pen can be used as a colorant for the oil based ink for a ball point pen.

The dyes include, for example, Valifast Color (manufacture by Orient Chemical, Ind., Ltd., a registered trademark name), Aizen Spilon Dye and Aizen SOT Dye (manufactured by Hodogaya Chemical Co., Ltd., registered trademark names). The pigments include, for example, inorganic pigments such as titanium oxide, carbon black and metal powder, azo lake, insoluble azo pigment, chelate azo pigment, phthalocyanine pigment, perylene pigment, anthraquinone pigment, quinacridone pigment, lake pigment, nitro pigment and nitroso pigment. These dyes and pigments can be used alone or blended in combination of two or more in an appropriate proportion.

Further, in addition to the aforementioned components, other components that may be added to the oil based ink for a ball point pen (base ink) include, for example, additives used for a regular oil based ink for a ball point pen such as a surfactant, a fungicide agent and a lubricant.

The content of the additive of the present invention having the above constitution to be added to the oil based ink for a ball point pen ranges from 0.1 to 30% by weight, preferably from 0.5 to 20% by weight and more preferably from 1 to 15% by weight based on the total amount of the ink. If the content is below 0.1% by weight, no effects as a preventing agent against leakage can be obtained and if the content exceeds 30% by weight, it is difficult to mix the additive in the ink.

The present invention is constituted as described above. Only when the additive containing at least one or plural kinds of the organic solvents, the resin and the inorganic fine particle thickener is prepared in advance and added to the base ink, obtained is the oil based ink for a ball point pen which can be prevented the inorganic fine particle thickner from thickening and precipitating with the passage of time even in the case that the inorganic fine particle thickener are contained, and which cause no starving in the drawn line, no impossibility of writing and few blobbings, and which further is superior in production efficiency and can prevent from leaking. Particularly, the ink is suitable for a ball point pen with a ball having a diameter of 1.0 mm or more charged with an oil based ink.

EXAMPLES

The present invention shall be further explained in detail with reference to Examples and Comparative Examples, but the present invention shall not be restricted to these Examples and Comparative Examples.

Example 1

Additive composition

Organic solvent:

| | |
|---|---|
| Phenoxyethanol | 38.0% by weight |
| Benzyl alcohol | 10.0% by weight |

Resin:

| | |
|---|---|
| Ketone resin (Hilac #110H (manufactured by Hitachi Chemical Co., Ltd.)) | 45.0% by weight |

Polyvinyl pyrrolidone:

| | |
|---|---|
| PVP K90 (manufactured by ISP Co., Ltd.) | 2.0% by weight |

Inorganic fine particle thickener:

| | |
|---|---|
| Aerosil #380 (average primary particle diameter: 7 nm; specific surface area (BET method): 380 m²/g) | 5.0% by weight |

Base ink composition

Dye:

| | |
|---|---|
| Valifast Black #1802 (manufactured by Orient Chemical Ind., Ltd.) | 17.6% by weight |
| Spilon Violet C-RH (manufactured by Hodogaya Chemical Co., Ltd.) | 11.8% by weight |
| Valifast Yellow AUM (manufactured by Orient Chemical Ind., Ltd.) | 5.9% by weight |

Organic solvent:

| | |
|---|---|
| Phenoxyethanol | 44.3% by weight |
| Benzyl alcohol | 10.0% by weight |

Resin:

| | |
|---|---|
| Ketone resin (Hilac #111 (manufactured by Hitachi Chemical Co., Ltd.) | 6.3% by weight |

Polyvinyl pyrrolidone:

| | |
|---|---|
| PVP K90 (manufactured by ISP Co., Ltd.) | 0.6% by weight |

Lubricant:

| | |
|---|---|
| Oleic acid | 3.5% by weight |

These compositions were heated and stirred at 60° C. respectively, and then an additive was mixed by means of a three roll mill and a base ink was filtered.

Obtained was the additive having a viscosity of 1000 mPa·s or more at a shear rate of 5/s and at 0° C., a viscosity of 50000 mPa·s or less at a shear rate of 5/s and at 50° C., and a non-Newtonian index of from 0.30 to 0.95 at 25° C. An absorbance at 900 nm which was determined by using a 1 cm long cell by means of an absorptiometer was 0.35.

The resultant additive and base ink were mixed in a proportion of 15 to 85 to obtain a black ink having a viscosity of 8000 mPa·s.

Example 2

Additive Composition

Organic solvent:

| | |
|---|---|
| Phenoxyethanol | 30.0% by weight |
| Benzyl alcohol | 10.0% by weight |

Resin:

| | |
|---|---|
| Ketone resin (Hilac #110H (manufactured by Hitachi Chemical Co., Ltd.)) | 50.0% by weight |

Polyvinyl pyrrolidone:

| | |
|---|---|
| PVP K30 (manufactured by ISP Co., Ltd.) | 4.0% by weight |

Inorganic fine particle thickener:

| | |
|---|---|
| Aerosil R974 (average primary particle diameter: 12 nm; the specific surface area (BET method): 170 m²/g) | 6.0% by weight |

Based ink composition

Dye:

| | |
|---|---|
| Valifast Black #1802 (manufactured by Orient Chemical Ind., Ltd.) | 16.7% by weight |
| Spilon Violet C-RH (manufactured by Hodogaya Chemical Co., Ltd.) | 11.1% by weight |
| Valifast Yellow AUM (manufactured by Orient Chemical Ind., Ltd.) | 5.6% by weight |

Organic solvent:

| | |
|---|---|
| Phenoxyethanol | 35.6% by weight |
| Benzyl alcohol | 10.0% by weight |

Resin:

| | |
|---|---|
| Ketone resin (Hilac #111 (manufactured by Hitachi Chemical Co., Ltd.) | 14.4% by weight |

Polyvinyl pyrrolidone:

| | |
|---|---|
| PVP K90 (manufactured by ISP Co., Ltd.) | 1.1% by weight |

Lubricant:

| | |
|---|---|
| Oleic acid | 5.5% by weight |

These compositions were heated and stirred at 60° C. respectively, and then an additive was mixed by means of a three roll mill and a base ink was filtered.

Obtained was the additive having a viscosity of 1000 mPa·s or more at a shear rate of 5/s and at 0° C., a viscosity of 50000 mPa·s or less at a shear rate of 5/s and at 50° C., and a non-Newtonian index of from 0.30 to 0.95 at 25° C. An absorbance at 900 nm which was determined by using a 1 cm long cell by means of an absorptiometer was 0.80.

The resultant additive and base ink were mixed in a proportion of 1 to 9 to obtain a black ink having a viscosity of 12000 mPa·s.

Example 3

Additive Composition

Organic solvent:

| | |
|---|---|
| Phenoxyethanol | 49.0% by weight |
| Benzyl alcohol | 10.0% by weight |

Resin:

| | |
|---|---|
| Ketone resin (Hilac #111 (manufactured by Hitachi Chemical Co., Ltd.)) | 35.0% by weight |

Polyvinyl pyrrolidone:

| | |
|---|---|
| PVP K15 (manufactured by ISP Co., Ltd.) | 1.0% by weight |

Inorganic fine particle thickener:

| | |
|---|---|
| Aerosil R202 (average primary particle diameter: 14 nm; specific surface area (BET method): | 5.0% by weight |

-continued 100 m²/g)

| Base ink composition | |
|---|---|
| Dye: | |
| Valifast Black #1603 (manufactured by Orient Chemical Ind., Ltd.) | 15.0% by weight |
| Savinyl Blue (manufactured by Sandoz Co., Ltd.) | 15.0% by weight |
| Organic solvent: | |
| Phenoxyethanol | 47.5% by weight |
| Benzyl alcohol | 10.0% by weight |
| Polyvinyl pyrrolidone: | |
| PVP K30 (manufactured by ISP Co., Ltd.) | 9.0% by weight |
| PVP K90 (manufactured by ISP Co., Ltd.) | 0.5% by weight |
| Lubricant: | |
| Oleic acid | 3.0% by weight |

These compositions were heated and stirred at 60° C. respectively, and then an additive was mixed by means of a three roll mill and a base ink was filtered.

Obtained was the additive having a viscosity of 1000 mPa·s or more at a shear rate of 5/s and at 0° C., a viscosity of 50000 mPa·s or less at a shear rate of 5/s and at 50° C., and a non-Newtonian index of from 0.30 to 0.95 at 25° C. An absorbance at 900 nm which was determined by using a 1 cm long cell by means of an absorptiometer was 1.50.

The resultant additive and base ink were mixed in a proportion of 2 to 98 to obtain a blue ink having a viscosity of 10000 mPa·s.

Example 4

| Additive composition | |
|---|---|
| Organic solvent: | |
| Phenoxyethanol | 30.0% by weight |
| Benzyl alcohol | 9.0% by weight |
| Resin: | |
| Ketone resin (Hilac #111 (manufactured by Hitachi Chemical Co., Ltd.)) | 50.0% by weight |
| Polyvinyl pyrrolidone: | |
| PVP K90 (manufactured by ISP Co., Ltd.) | 3.0% by weight |
| Inorganic fine particle thickener: | |
| Aerosil COK84 (average primary particle diameter: 12 nm; specific surface area (BET method): 170 m²/g) | 8.0% by weight |
| Base ink Composition Dye: | |
| Spilon Red C-BH (manufactured by Hodogaya Chemical Co., Ltd.) | 4.0% by weight |
| Spilon Red C-GH (manufactured by Hodogaya Chemical Co., Ltd.) | 4.0% by weight |
| SPT Orange (manufactured by Hodogaya Chemical Co., Ltd.) | 15.0% by weight |
| Organic solvent: | |
| Phenoxyethanol | 40.0% by weight |
| Benzyl alcohol | 15.5% by weight |
| Resin: | |
| Ketone resin (Hilac #110H (manufactured by Hitachi Chemical Co., Ltd.) | 18.0% by weight |

-continued

| Polyvinyl pyrrolidone: | |
|---|---|
| PVP K90 (manufactured by ISP Co., Ltd.) | 0.5% by weight |
| Lubricant: | |
| Oleic acid | 3.0% by weight |

These compositions were heated and stirred at 60° C. respectively, and then an additive was mixed by means of a three roll mill and a base ink was filtered.

Obtained was the additive having a viscosity of 1000 mPa·s or more at a shear rate of 5/s and at 0° C., a viscosity of 50000 mPa·s or less at a shear rate of 5/s and at 50° C., and a non-Newtonian index of from 0.30 to 0.95 at 25° C. An absorbance at 900 nm which was determined by using a 1 cm long cell by means of an absorptiometer 1.90.

The resultant additive and base ink were mixed in a proportion of 1 to 99 to obtain a red ink having a viscosity of 11000 mPa·s.

Comparative Example 1

The additive composition of Example 1 was prepared in the same way as in Example 1 except that Hilac #110H was substituted for the inorganic fine particle thickener. The resultant additive and the base ink in Example 1 were mixed in the same proportion as shown in Example 1 to prepare an oil based ink for a ball point pen.

| Additive Composition | |
|---|---|
| Organic solvent: | |
| Phenoxyethanol | 38.0% by weight |
| Benzyl alcohol | 10.0% by weight |
| Resin: | |
| Ketone resin (Hilac #110H (manufactured by Hitachi Chemical Co., Ltd.)) | 50.0% by weight |
| Polyvinyl pyrrolidone: | |
| PVP K90 (manufactured by ISP Co., Ltd.) | 2.0% by weight |

| Base ink Composition | |
|---|---|
| Dye: | |
| Valifast Black #1802 (manufactured by Orient Chemical Ind., Ltd.) | 17.6% by weight |
| Spilon Violet C-RH (manufactured by Hodogaya Chemical Co., Ltd.) | 11.8% by weight |
| Valifast Yellow AUM (manufactured by Orient Chemical Ind., Ltd.) | 5.9% by weight |
| Organic solvent: | |
| Phenoxyethanol | 44.3% by weight |
| Benzyl alcohol | 10.0% by weight |
| Resin: | |
| Ketone resin (Hilac #111 (manufactured by Hitachi Chemical Co., Ltd.) | 6.3% by weight |
| Polyvinyl pyrroiidone: | |
| PVP K90 (manufactured by ISP Co., Ltd.) | 0.6% by weight |
| Lubricant: | |
| Oieic acid | 3.5% by weight |

These compositions were heated and stirred at 60° C. respectively, and then an additive was mixed by means of a three roll mill and a base ink was filtered.

Obtained was the additive having a viscosity of 1000 mPa·s or more at a shear rate of 5/s and at 0° C., a viscosity of 50000 mPa·s or less at a shear rate of 5/s and at 50° C., and a non-Newtonian index of from 0.30 to 0.95 at 25° C. An absorbance at 900 nm which was determined by using a 1 cm long cell by means of an absorptiometer was 0.000.

The resultant additive and base ink were mixed in a proportion of 15 to 85 to obtain a black ink having a viscosity 8000 mPa·s.

Comparative Example 2

The additive composition of Example 1 was prepared in the same way as in Example 1 except that the amount of the inorganic fine particle thickener was reduced, while the added amounts of Hilac #110H and PVP K90 were increased instead. The resultant additive and the base ink in Example 1 were mixed in the same proportion as shown in Example 1 to prepare an oil based ink for a ball point pen.

| Additive Composition | |
|---|---|
| Organic solvent: | |
| Phenoxyethanol | 38.0% by weight |
| Benzyl alcohol | 10.0% by weight |
| Resin: | |
| Ketone resin (Hilac #110H (manufactured by Hitachi Chemical Co., Ltd.)) | 47.0% by weight |
| Polyvinyl pyrrolidone: | |
| PVP K90 (manufactured by ISP Co., Ltd.) | 3.0% by weight |
| Inorganic fine particle thickener: | |
| Aerosil #380 (average primary particle diameter: 7 nm; specific surface area (BET method): 380 m$^2$/g) | 2.0% by weight |

| Base ink composition | |
|---|---|
| Dye: | |
| Valifast Black #1802 (manufactured by Orient Chemical Ind., Ltd.) | 17.6% by weight |
| Spilon Violet C-RH (manufactured by Hodogaya Chemical Co., Ltd.) | 11.8% by weight |
| Valifast Yellow AUM (manufactured by Orient Chemical Ind., Ltd.) | 5.9% by weight |
| Organic solvent: | |
| Phenoxyethanol | 44.3% by weight |
| Benzyl alcohol | 10.0% by weight |
| Resin: | |
| Ketone resin (Hilac #111 (manufactured by Hitachi Chemical Co., Ltd.) | 6.3% by weight |
| Polyvinyl pyrrolidone: | |
| PVP K90 (manufactured by ISP Co., Ltd.) | 0.6% by weight |
| Lubricant: | |
| Oleic acid | 3.5% by weight |

These compositions were heated and stirred at 60° C. respectively, and then an additive was mixed by means of a three roll mill and a base ink was filtered.

Obtained was the additive having a viscosity of 1000 mPa·s or more at a shear rate of 5/s and at 0° C., a viscosity of 50000 mPa·s or less at a shear rate of 5/s and at 50° C., and a non-Newtonian index of from 0.30 to 0.95 at 25° C. An absorbance at 900 nm which was determined by using a 1 cm long cell by means of an absorptiometer was 0.009.

The resultant additive and base ink were mixed in a proportion of 15 to 85 to obtain a black ink having a viscosity 8000 mPa·s.

Comparative Example 3

The additive composition of Example 1 was prepared in the same way as in Example 1 except that the amount of the inorganic fine particle thickener was increased, while the added amounts of Hilac #110H and PVP K90 were reduced instead. The resultant additive and the base ink of Example 1 were mixed in the same proportion as shown in Example 1 to prepare an oil based ink for a ball point pen.

| Additive Composition | |
|---|---|
| Organic solvent: | |
| Phenoxyethanol | 38.0% by weight |
| Benzyl alcohol | 10.0% by weight |
| Resin: | |
| Ketone resin (Hilac #110H (manufactured by Hitachi Chemical Co., Ltd.)) | 44.0% by weight |
| Polyvinyl pyrrolidone: | |
| PVP K90 (manufactured by ISP Co., Ltd.) | 0.8% by weight |
| Inorganic fine particle thickener: | |
| Aerosil #380 (average primary particle diameter: 7 nm; specific surface area (BET method): 380 m$^2$/g) | 7.2% by weight |

| Base ink Composition | |
|---|---|
| Dye: | |
| Valifast Black #1802 (manufactured by Orient Chemical Ind., Ltd.) | 17.6% by weight |
| Spilon Violet C-RH (manufactured by Hodogaya Chemical Co., Ltd.) | 11.8% by weight |
| Valifast Yellow AUM (manufactured by Orient Chemical Ind., Ltd.) | 5.9% by weight |
| Organic solvent: | |
| Phenoxyethanol | 44.3% by weight |
| Benzyl alcohol | 10.0% by weight |
| Resin: | |
| Ketone resin (Hilac #111 (manufactured by Hitachi Chemical Co., Ltd.) | 6.3% by weight |
| Polyvinyl pyrrolidone: | |
| PVP K90 (manufactured by ISP Co., Ltd.) | 0.6% by weight |
| Lubricant: | |
| Oleic acid | 3.5% by weight |

These compositions were heated and stirred at 60° C. respectively, and then an additive was mixed by means of a three roll mill and a base ink was filtered.

Obtained was the additive having a viscosity of 1000 mPa·s or more at a shear rate of 5/s and at 0° C., a viscosity of 50000 mPa·s or less at a shear rate of 5/s and at 50° C., and a non-Newtonian index of from 0.30 to 0.95 at 25° C. An absorbance at 900 nm which was determined by using a 1 cm long cell by means of an absorptiometer was 6.8.

The resultant additive and base ink were mixed in a proportion of 15 to 85 to obtain a black ink having a viscosity 8000 mPa·s.

Comparative Example 4

An oil based ink for a ball point pen was prepared in such a way that the inorganic fine particle thickener is added not as an additive but directly to the ink composition so that the final amounts of the blending components would become about the same as those of the above Example 1.

| Ink Composition | |
|---|---|
| Dye: | |
| Valifast Black #1802 (manufactured by Orient Chemical Ind., Ltd.) | 15.0% by weight |
| Spilon Violet C-RH (manufactured by Hodogaya Chemical Co., Ltd.) | 10.0% by weight |
| Valifast Yellow AUM (manufactured by Orient Chemical Ind., Ltd.) | 5.0% by weight |
| Organic solvent: | |
| Phenoxyethanol | 43.0% by weight |
| Benzyl alcohol | 10.0% by weight |
| Resin: | |
| Ketone resin (Hilac #111 (manufactured by Hitachi Chemical Co., Ltd.) | 5.4% by weight |
| Ketone resin (Hilac #110 (manufactured by Hitachi Chemical Co., Ltd.) | 7.0% by weight |
| Polyvinyl pyrrolidone: | |
| PVP K90 (manufactured by ISP Co., Ltd.) | 0.8% by weight |
| Lubricant: | |
| Oleic acid | 3.0% by weight |
| Inorganic fine particle thickener: | |
| Aerosil #380 (average primary particle diameter: 7 nm; specific surface area (BET method): 380 m²/g) | 0.8% by weight |

The compositions excluding the inorganic fine particle thickener was heated and stirred at 60° C., and then the composition was filtered. Then, the inorganic fine particle thickener was added to the composition to further be heated and stirred at 60°. Thus a black ink having a viscosity 8000 mPa·s was obtained.

Each ink obtained in Examples 1 to 4 and in Comparative Examples 1 to 4 was charged into a ball point pen refill using a stainless steel tip with a ball having a diameter of 1.00 mm to conduct an ink leaking test and a writing test after the ball point pens had been left downward according to the following methods for evaluation.

These results are shown in Table 1 below.

Ink Leaking Test

Condition A: Temperature 50° C.; Humidity 80%; 7 days

Condition B: Temperature 25° C.; Humidity 60%; 7 days

Each of the ball point pens used for writing randomly was left standing under each of the above conditions with its tip downward and then the amount of ink leaked from the pen tip was determined by the following evaluation standards. The data are based on the mode out of the 10 samples.

⊚: No ink leakage is observed.

○: A very little amount of ink leakage is observed on the pen tip.

Δ: A medium amount of ink leakage is observed on the pen tip.

▲: A large amount of ink leakage is observed on the pen tip.

X: Ink has dripped.

Writing Test

A writing test was conducted by writing freehand with a ball point pen on paper after the tip of the ball point pens had been loaded with 1300G for 3 hours by means of a centrifugal separator. Then, the starving condition was evaluated by the following evaluation standards.

⊚: No starving is observed at all.

○: A little starving is observed.

Δ: Much starving is observed.

X: Impossible to write.

TABLE 1

| | Amount of Ink Leakage | | Writing Performance |
|---|---|---|---|
| | Condition A | Condition B | |
| Example 1 | ○ | ○ | ⊚ |
| Example 2 | ○ | ⊚ | ⊚ |
| Example 3 | ⊚ | ⊚ | ○ |
| Example 4 | ⊚ | ⊚ | ⊚ |
| Comparative Example 1 | ▲ | ▲ | ⊚ |
| Comparative Example 2 | ▲ | Δ | ⊚ |
| Comparative Example 3 | ⊚ | ⊚ | Δ |
| Comparative Example 4 | ⊚ | ⊚ | X |

As apparent from the results shown in Table 1 above, it is clearly understood that the inks in which the additives obtained in Examples 1 to 4 were added to the base inks are prevented from ink leakage, and do not cause much starving and impossibility of writing even though the tips of the ball point pens were loaded with 1300G for 3 hours.

Further, as apparent from the result of Comparative Example 1, it is understood that when the inorganic fine particle thickener is not added, more ink leakage is caused.

As apparent from the results of Comparative Examples 2 and 3, it is understood that when the additives which are outside the scope of the present invention are added, there is a problem either in ink leakage or in writability.

As apparent from the result of Comparative Example 4, it is understood that when the inorganic fine particle thickener is added directly to an ink, there is a problem in writability.

Further, all of the tests which were conducted using the additives and inks, which are prepared by combining arbitrarily resins, solvents, inorganic fine particle thickeners and dyes within the scope of the present invention also showed the same results as the Examples.

As a result from the above, in accordance with the present invention, there are provided the additive for the oil based ink for a ball point pen which is prevented from thickening and precipitating with the passage of time and causes little leak age, few blobbings and no starving and no impossibility of writing, and the oil based ink for a ball point pen exhibiting these performances by containing the additive.

Industrial Applicability

The additive for the oil based ink for a ball point pen of the present invention can be added to an ordinary oil based ink for a ball point pen to turn it into the oil based ink for a ball point pen which prevented from ink leakage and causes little thickening and precipitating with the passage of time and few blobbings, no starving and no impossibility of writing.

What is claimed is:

1. An additive for an oil based ink for a ball point pen containing at least one or plural kinds of organic solvents, a resin and an inorganic fine particle thickener, wherein the additive has a viscosity of 1000 mPa·s or more at a shear rate of 5/s and at 0° C. and a viscosity of 50000 mPa·s or less at a shear rate of 5/s and 50° C. and has a non-Newtonian index of from 0.30 to 0.95, and wherein the additive has an absorbance of from 0.01 to 5 at a wavelength of 900 nm when a cell is 1 cm long.

2. The additive for an oil based ink for a ball point pen described in claim 1, wherein a specific surface area (BET method) of said inorganic fine particle thickener ranges from 30 to 500 m²/g and an average diameter of the primary particles thereof ranges from 5 to 50 nm.

3. The additive for an oil based ink for a ball point pen described in claim 1, wherein said inorganic fine particle thickener comprises inorganic fine particles containing $SiO_2$ of 70% by weight or more.

4. The additive for an oil based ink for a ball point pen described in claim 1, wherein polyvinyl pyrrolidone is contained as a resin in an amount of 0.05 to 10% by weight.

5. An oil based ink for a ball point pen which contains 0.1 to 30% by weight of the additive described in claim 1.

6. An oil based ink for a ball point pen which contains 0.1 to 3% by weight of the additive described in claim 2.

7. An oil based ink for a ball point pen which contains 0.1 to 30% by weight of the additive described in claim 3.

8. An oil based ink for a ball point pen which contains 0.1 to 30% by weight of the additive described in claim 4.

9. An oil based ball point pen which contains 0.1 to 30% by weight of the additive described in claim 4.

* * * * *